(12) United States Patent
Traut (10) Patent No.: US 7,558,723 B2
(45) Date of Patent: Jul. 7, 2009

(54) SYSTEMS AND METHODS FOR BIMODAL DEVICE VIRTUALIZATION OF ACTUAL AND IDEALIZED HARDWARE-BASED DEVICES

(75) Inventor: Eric Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 10/734,450

(22) Filed: Dec. 12, 2003

(65) Prior Publication Data

US 2005/0131668 A1 Jun. 16, 2005

(51) Int. Cl.
*G06F 9/455* (2006.01)
*G06F 3/00* (2006.01)
*G06F 9/46* (2006.01)

(52) U.S. Cl. .................. 703/24; 719/321; 719/324; 718/108

(58) Field of Classification Search .................. 703/23, 703/24; 719/321, 324
See application file for complete search history.

(56) References Cited

U.S. PATENT DOCUMENTS

| 5,548,783 | A | * | 8/1996 | Jones et al. ............. 710/16 |
| 5,940,613 | A | * | 8/1999 | Berliner ................ 719/324 |
| 6,785,894 | B1 | * | 8/2004 | Ruberg ................. 719/321 |
| 2002/0143842 | A1 | * | 10/2002 | Cota-Robles et al. ....... 709/1 |
| 2002/0161996 | A1 | * | 10/2002 | Koved et al. ............ 713/150 |
| 2003/0061401 | A1 | * | 3/2003 | Luciani, Jr. ............ 709/324 |
| 2003/0061497 | A1 | * | 3/2003 | Zimmer ................ 713/189 |

FOREIGN PATENT DOCUMENTS

EP 0 664 507 A2 7/1995

\* cited by examiner

*Primary Examiner*—Paul L Rodriguez
*Assistant Examiner*—Nithya Janakiraman
(74) *Attorney, Agent, or Firm*—Woodcock Washburn LLP (57) ABSTRACT

Various embodiments of the present invention are directed to bimodal virtual device approaches (that is, "bimodal devices"). In certain embodiments, the bimodal device is a virtual device that is primarily based on a real piece of hardware to provide a broad degree of compatibility with software running in the guest environment (similar to the hardware device virtualization approach). However, to overcome the problem of poor performance that plague hardware virtual devices, these embodiments also provide an idealized "high-performance mode" that is not found in the original hardware-based device. Software drivers (and other software) developed for interacting with the original hardware device and which are unaware of (and unable to use) the high-performance mode will continue to use the "legacy mode" (hardware virtualization), while enhanced versions of guest software will be able to recognize and utilize the high-performance mode (idealized virtualization).

39 Claims, 7 Drawing Sheets

SYSTEMS AND METHODS FOR BIMODAL DEVICE VIRTUALIZATION OF ACTUAL AND IDEALIZED HARDWARE-BASED DEVICES

TECHNICAL FIELD

The present invention generally relates to the field of virtual devices in computer systems and, more specifically, to enhanced virtual devices in computer systems that selectively operate as a hardware virtual device or an idealized virtual device as appropriate.

BACKGROUND

A virtual device is a logical device, implemented in software, that corresponds to some kind of actual or idealized physical device. There are generally two approaches for modeling virtual devices: the "hardware virtual device" approach which directly models an existing piece of hardware; and the "idealized virtual device" approach which is not a mere reflection of the physical hardware but is optimized for the VM environment.

The hardware virtual device approach offers advantages in regard to compatibility—since the virtual device acts just like a real device in every respect, software that has been designed to interact with that device (e.g., a driver) will work with a hardware virtual device without modification. However, hardware virtual devices are at a disadvantage when it comes to performance—physical hardware is often difficult to emulate with a virtual device without incurring significant overhead costs (and inefficiencies) since hardware designers generally do not take into consideration virtualization issues, and thus hardware virtual devices are often noticeably slower than their real hardware counterparts.

Idealized virtual devices, on the other hand, provide significant freedom for developers to design a virtual device that is both easy to implement and efficient to use. Because the design of an idealized virtual device does not need to conform to limitations imposed by the physical hardware design, idealized virtual devices can be optimized for use within a VM environment. Furthermore, developers of idealized virtual devices do not need to concern themselves with the subtle side effects (such as timing, state changes, etc.) that existing software might rely on for correct operation. Moreover, developers can also create idealized virtual devices that are analogous to hardware that does not in fact exist—for example, a virtual device that allows for communication between a guest system and a host system. However, the downside is that compatibility issues may arise with the idealized virtual device approach since the virtual device may not in fact operate just like the real device in every respect, and software that has been designed to interact with that physical device (e.g., a driver) may not work correctly or at all with an idealized virtual device without modification.

What is needed in the art is an approach to virtualized devices that comprises the advantages of the two existing approaches discussed herein but lacks most of the limitations thereof.

SUMMARY

Various embodiments of the present invention are directed to bimodal virtual device approaches (that is, "bimodal devices") that combine the relative strengths of the hardware and idealized device virtualization approaches while also mitigating their respective weaknesses. In certain embodiments, the bimodal device is a virtual device that is primarily based on a real piece of hardware to provide a broad degree of compatibility with software running in the guest environment (similar to the hardware device virtualization approach). However, to overcome the problem of poor performance that plagues hardware virtual devices, these embodiments also provide an idealized "high-performance mode" that is not found in the original hardware-based device. Software drivers (and other software) developed for interacting with the original hardware device and which are unaware of (and unable to use) the high-performance mode will continue to use the "legacy mode" (hardware virtualization), while enhanced versions of guest software will be able to recognize and utilize the high-performance mode (idealized virtualization).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
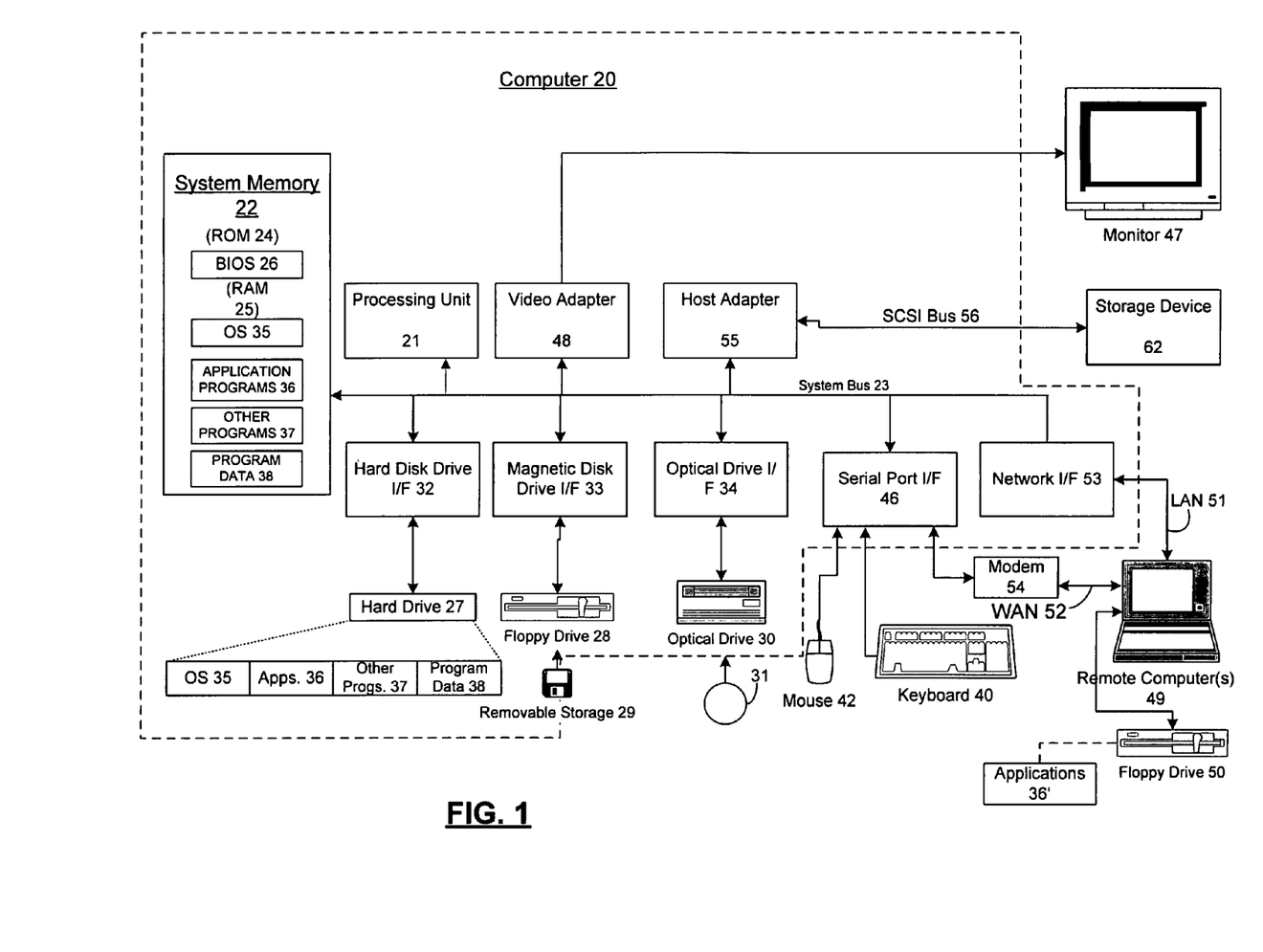
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
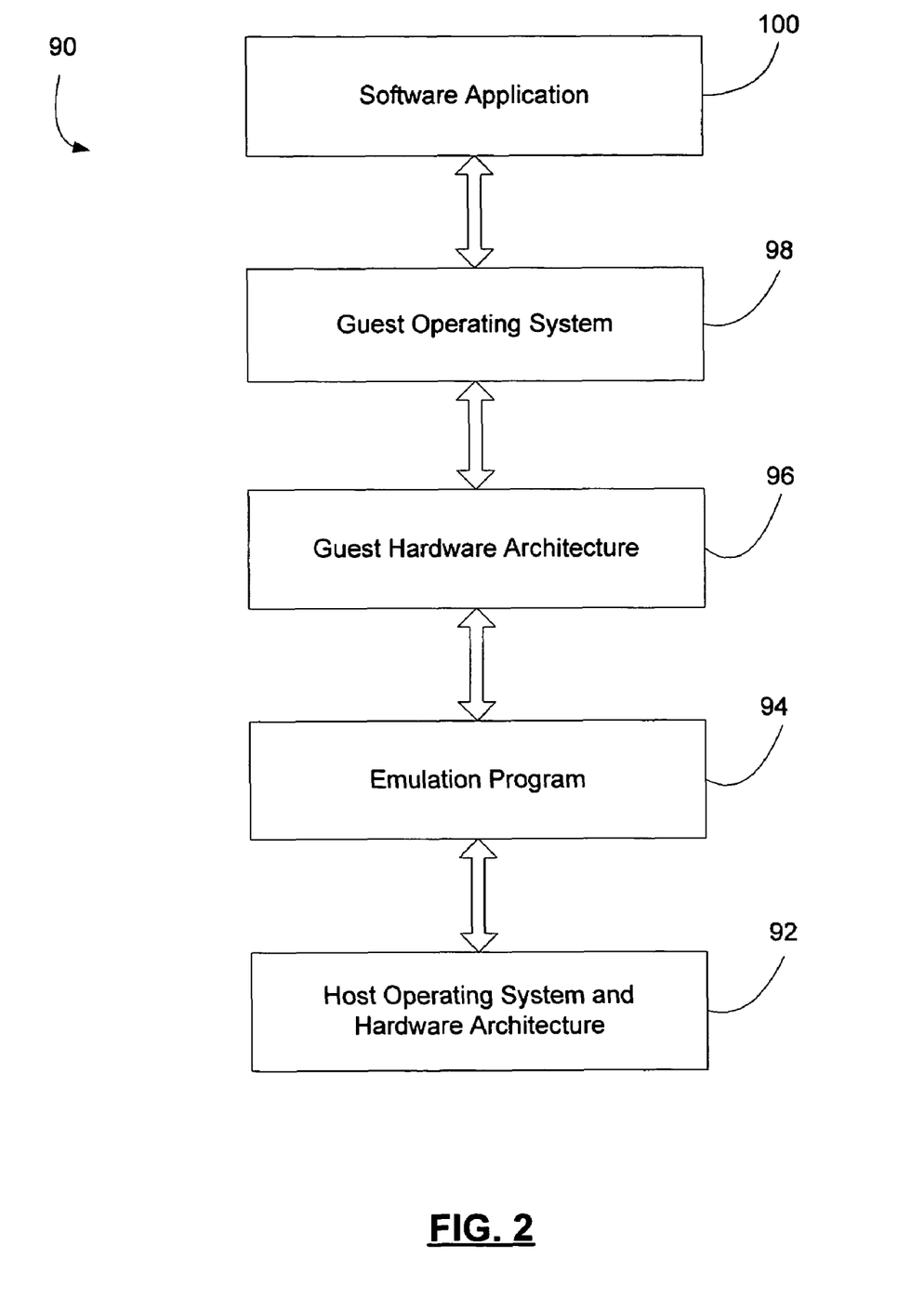
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
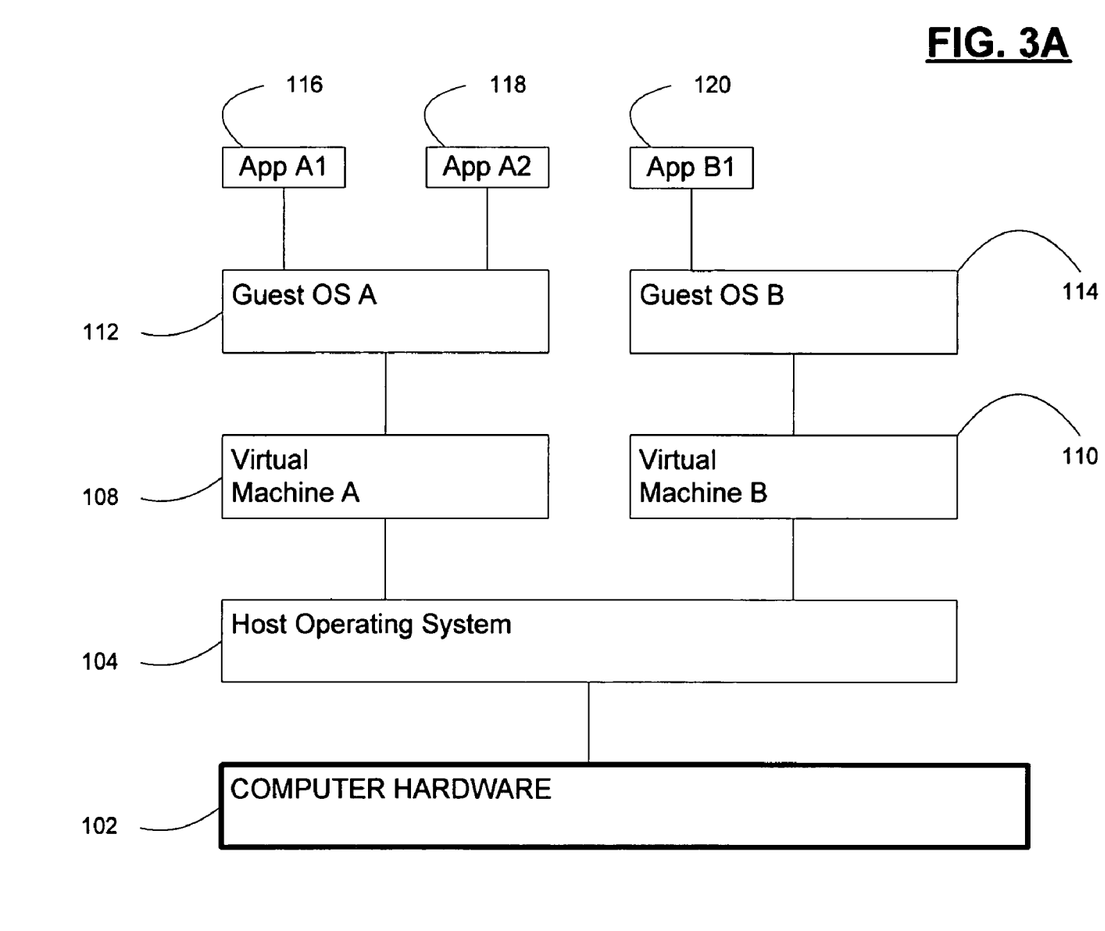
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
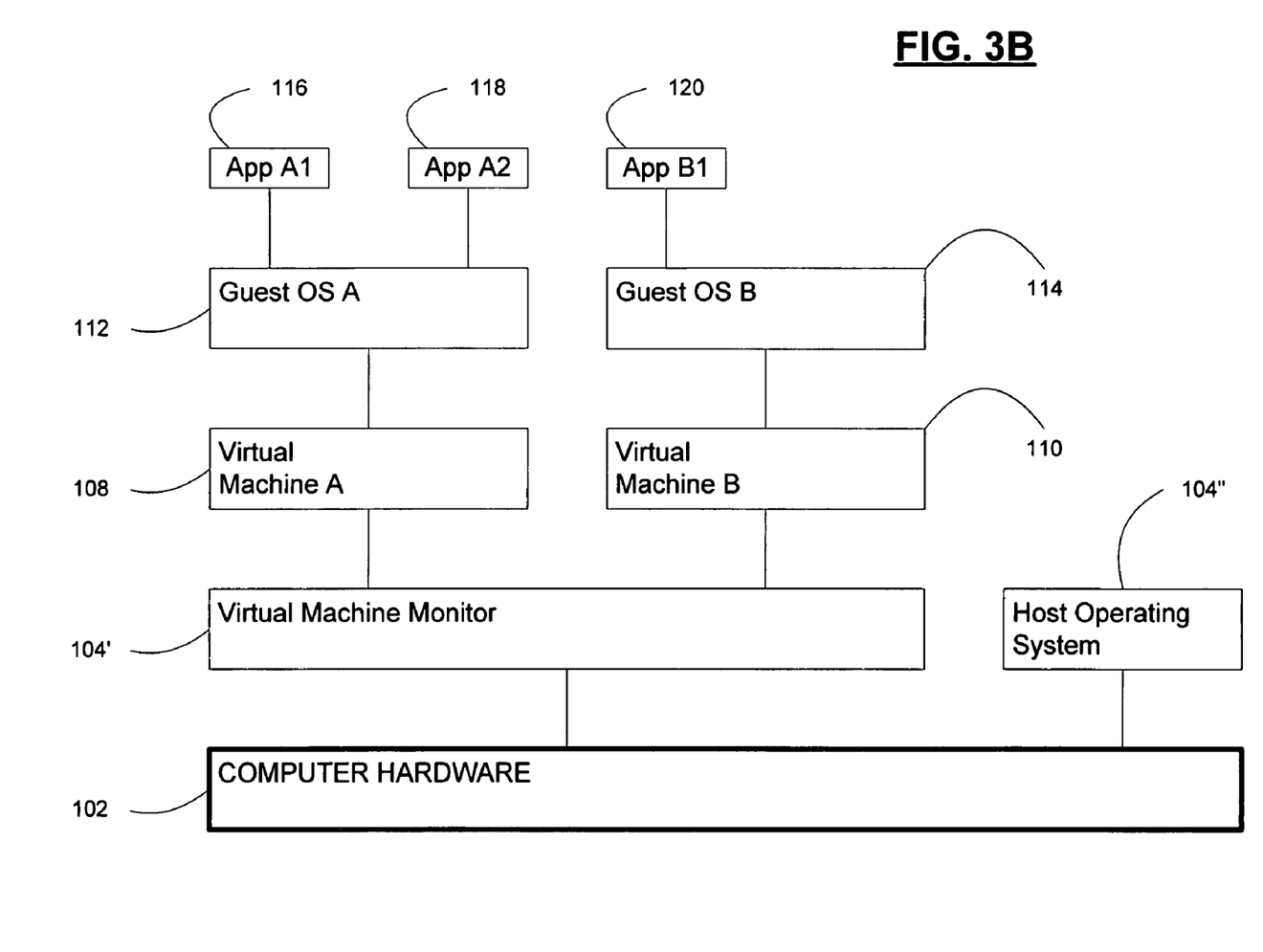
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Above guest OS A 112 are running two applications, application A1 116 and application A2 118, and above guest OS B 114 is Application B1 120.

Virtual Devices

In regard to the physical hardware devices, VMs present several options for allowing software applications to utilize said hardware devices. In some VM systems, a hardware device (such as a hard drive or a network adapter) may be assigned to a single VM, and only software running in that VM can utilize that hardware device (a dedicated-device architecture). However, this design prevents the sharing of hardware devices among different VMs as well as between a VM and the host system. For this reason many VM implementations instead utilize "virtual devices."

A virtual device is a logical device, implemented in software, that corresponds to some kind of actual or idealized physical device. Virtual devices generally possess their own set of device states which may include, for example, register settings, buffered data, pending command queues, and so on and so forth. By way of unlimited example, for a virtual network adapter the software associated with the virtual adapter would be invoked when the network adapter is accessed by code running in the VM, and the virtual adapter could then respond to commands in a way that is consistent with a real adapter card. In this manner, the code running within the VM is unaware that it is "talking to" a virtual adapter rather than a real one, and the virtual adapter would then interact directly or indirectly with the real adapter to cause the real adapter to operate as desired.

In many cases, requests to a virtual device are mapped onto a corresponding host device. For example, networking packets that are sent from a virtual network adapter may be routed to one of the real network adapters installed in the host. In this respect, a virtual-device architecture provides a similar capability to that of the dedicated-device architecture described earlier. However, unlike the dedicated-device architecture, a virtual-device architecture allows multiple virtual devices to be mapped to a single host device (real device). For example, three independent VMs could each contain a virtual network adapter, and all three virtual adapters could share a single host adapter, whereas in a dedicated-device architecture only one VM could use the host adapter.

Figure 4A:
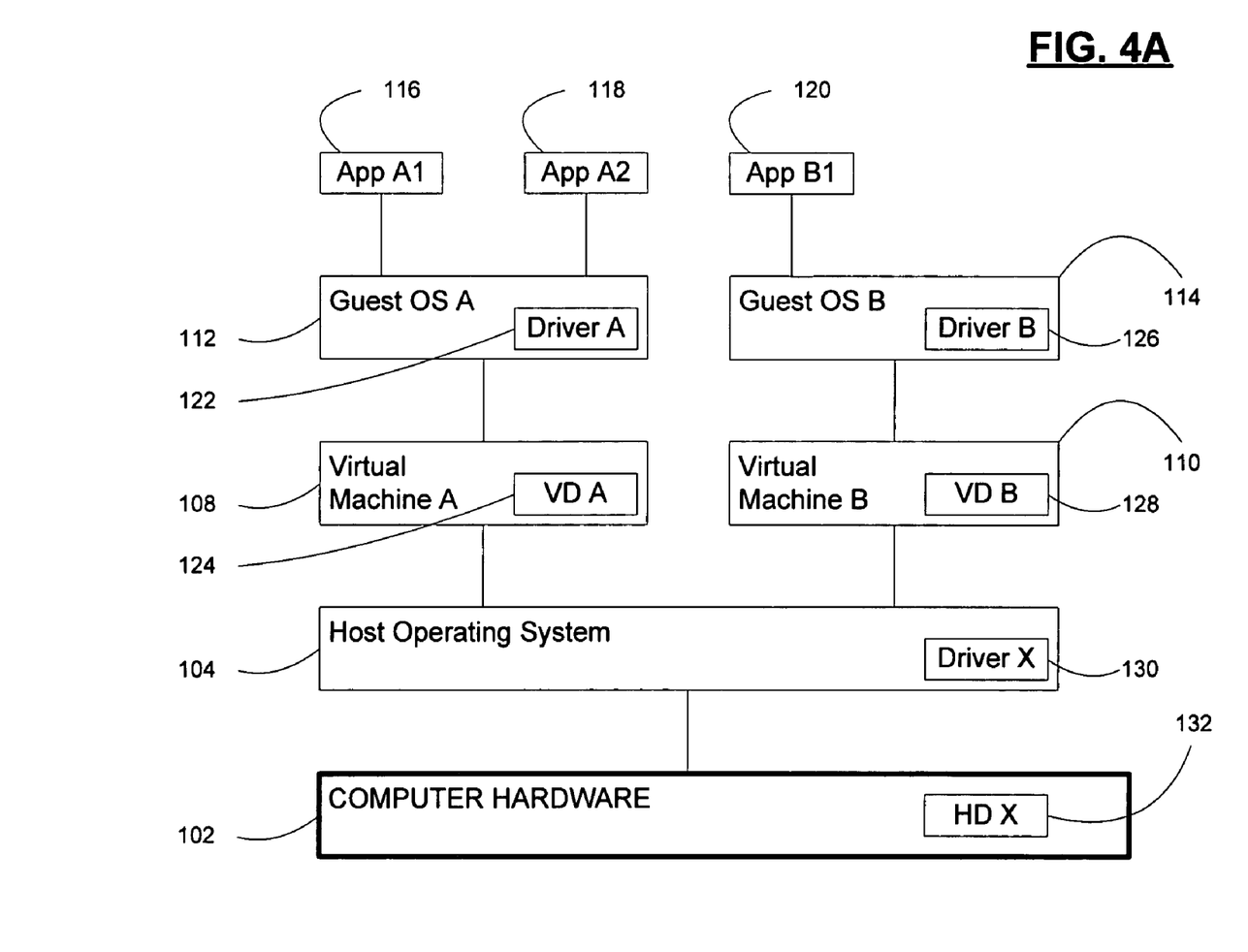
FIG. 4A illustrates the virtualized computing system of FIG. 3 further comprising drivers, virtual devices, and hardware.

FIG. 4A illustrates the virtualized computing system of FIG. 3 further comprising drivers, virtual devices, and hardware. Guest OS A 112 comprises driver A 122, and virtual machine A 108 comprises virtual device A 124 corresponding to driver A 122. Likewise, guest OS B 114 comprises driver B 126, and virtual machine B 110 comprises virtual device B 128 corresponding to driver B 126. In addition, the host OS 104 comprises driver X 130, and the computer hardware 102 comprises hardware device X 132 corresponding to driver X 130.

Figure 4B:
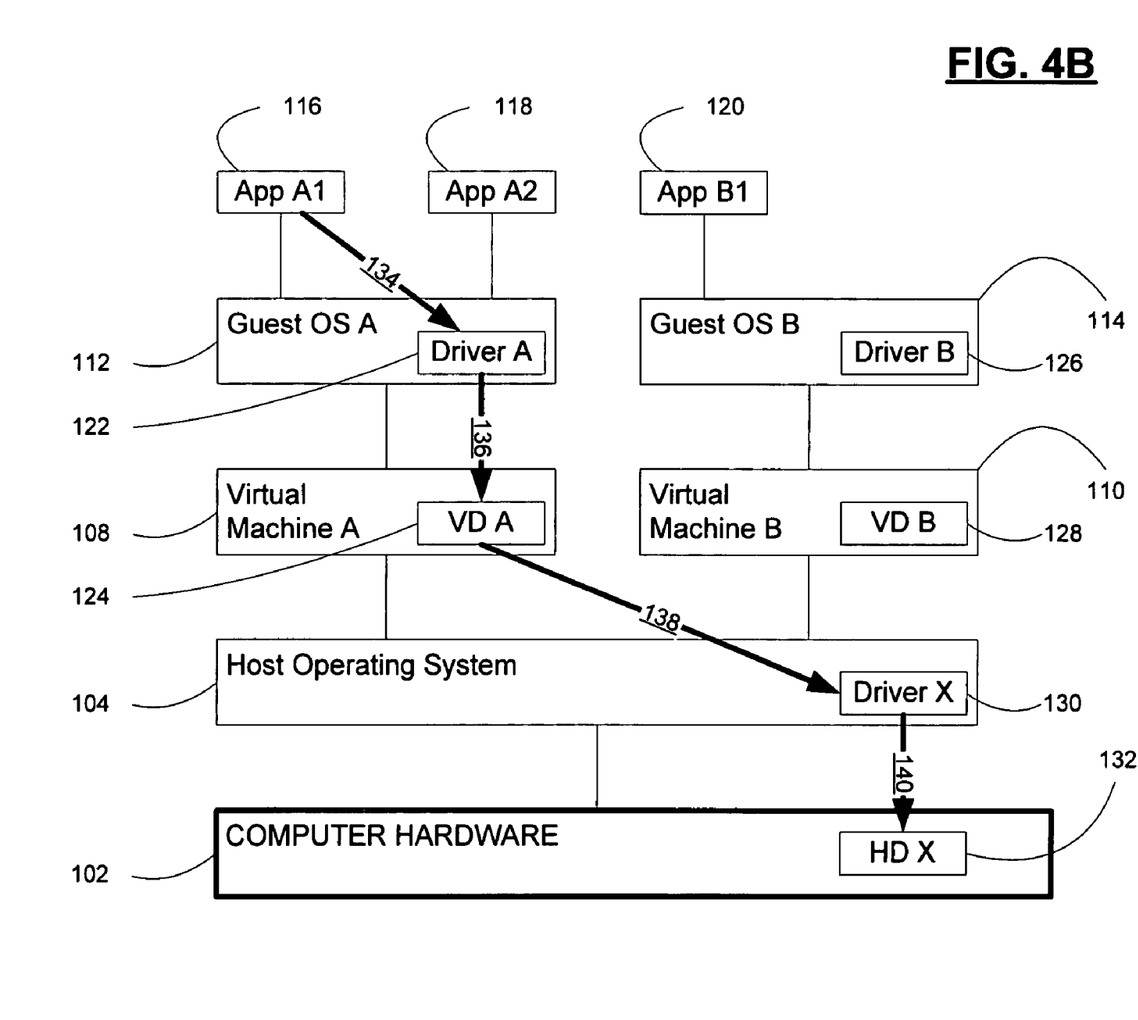
FIG. 4B illustrates the operational path from an application running on a guest operating system to a hardware device in the computer hardware of FIG. 4A.
Figure 5:
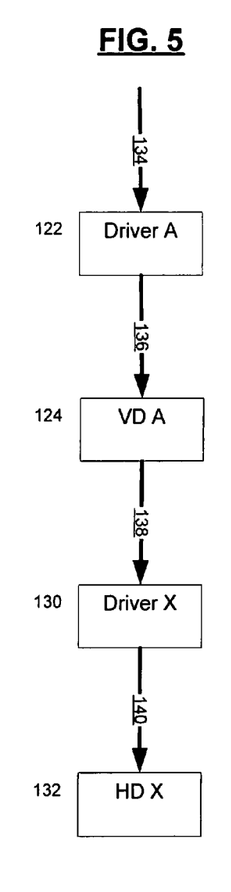
FIG. 5 more simply illustrates the same interrelationship among the drivers, virtual device, and hardware as shown in FIG. 4B.

FIG. 4B illustrates the operational path from an application running on a guest operation system to a hardware device in the computer hardware. Application A1 116 interfaces 134 with driver A 122 which, in turn, interfaces 136 with virtual device A 124. This virtual device A 124 then interfaces 138 with driver X 130 (in the host OS 104) which in turn communicates 140 directly with the hardware device X 132. FIG. 5 more simply illustrates the same interrelationship among the drivers, virtual device, and hardware as shown in FIG. 4B.

Bimodal Device

There are generally two approaches for modeling virtual devices: the "hardware virtual device" approach which directly models an existing piece of hardware; and the "idealized virtual device" approach which is not a mere reflection of the physical hardware but is optimized for the VM environment. The hardware virtual device approach offers advantages in regard to compatibility—since the virtual device acts just like a real device in every respect, software that has been designed to interact with that device (e.g., a driver) will work with a hardware virtual device without modification. However, hardware virtual devices are at a disadvantage when it comes to performance—physical hardware is often difficult to emulate with a virtual device without incurring significant overhead costs (and inefficiencies) since hardware designers generally do not take into consideration virtualization issues, and thus hardware virtual devices are often noticeably slower than their real hardware counterparts.

Idealized virtual devices, on the other hand, provide significant freedom for developers to design a virtual device that is both easy to implement and efficient to use. Because the design of idealized virtual devices does not need to conform to limitations imposed by the physical hardware design, idealized virtual devices can be optimized for use within a VM environment. Furthermore, developers of idealized virtual devices do not need to concern themselves with the subtle side effects (such as timing, state changes, etc.) that existing software might rely on for correct operation. Moreover, developers can also create idealized virtual devices that are analogous to hardware that does not in fact exist—for example, a virtual device that allows for communication between a guest system and a host system. However, the downside is that compatibility issues may arise with the idealized virtual device approach since the virtual device does not in fact operate just like the real device in every respect, and software that has been designed to interact with that physical device (e.g., a driver) many not work correctly or at all with an idealized virtual device without modification.

Various embodiments of the present invention are directed to bimodal virtual device approaches (that is, "bimodal devices") that combine the relative strengths of the hardware and idealized device virtualization approaches while also mitigating their respective weaknesses. In certain embodiments, the bimodal device is a virtual device that is primarily based on a real piece of hardware to provide a broad degree of compatibility with software running in the guest environment (similar to the hardware device virtualization approach). However, to overcome the problem of poor performance that plagues hardware virtual devices, these embodiments also provide an idealized "high-performance mode" that is not found in the original hardware-based device. Software drivers (and other software) developed for interacting with the original hardware device and which are unaware of (and unable to use) the high-performance mode will continue to use the "legacy mode" (hardware virtualization), while enhanced versions of guest software will be able to recognize and utilize the high-performance mode (idealized virtualization).

For certain embodiments, the high-performance mode can be completely independent of the original functionality of the legacy mode for the virtual device. Alternately, the high-performance mode may comprise extensions or replacements to the original functionality. Either way, the high-performance mode is akin to idealized processor virtualization approaches, whether it is independent of or an enhancement to the legacy mode functionality. Moreover, it should also be noted that, depending on which embodiment is utilized, switching to high-performance mode may completely disable the legacy mode, it may disable portions of the legacy mode, and/or it may extend the functionality of the legacy mode.

In certain embodiments of the present invention, the high-performance mode may be enabled through the use of reserved bits within the virtual device's registers, whereas alternative embodiments might instead add new registers (e.g., a register specifically created for utilization by one or more virtual devices) or may implement a form of handshaking whereby a prescribed sequence of commands or data is written to legacy registers.

By way of unlimited example, consider an Ethernet NIC bimodal device. In legacy mode, sending a packet of information to the Ethernet card might involve up to eight (8) individual writes to legacy I/O registers. These I/O accesses are required to set up parameters for the packet transfer including the DMA address (i.e. the location in RAM where the packet data can be found), the length of the transfer, and a command byte that initiates the transfer once the other parameters have been specified. However, each of these writes to I/O registers is relatively expensive within a VM, and the combined time required to virtualize these I/O accesses is significant and results in a major performance loss. However, an "idealized" virtual Ethernet card—that is, a virtual card running in high-performance mode—might only require one I/O access to initiate a packet send, and thus an Ethernet card bimodal device (e.g., one based on a DEC 21140 chipset) which is augmented with a high-performance mode would significantly increase performance in those instances where the high-performance mode could be utilized.

For certain embodiments, the high-performance mode might be enabled through the use of a special, modified driver installed within the guest operating system environment and, once the high-performance mode is enabled, the driver can use the more optimal mechanism for initiating a packet send. However, if the modified driver is not present in the guest, a legacy driver would still be able to provide networking functionality, albeit without the performance optimization allowed by the high-performance mode.

Figure 6A:
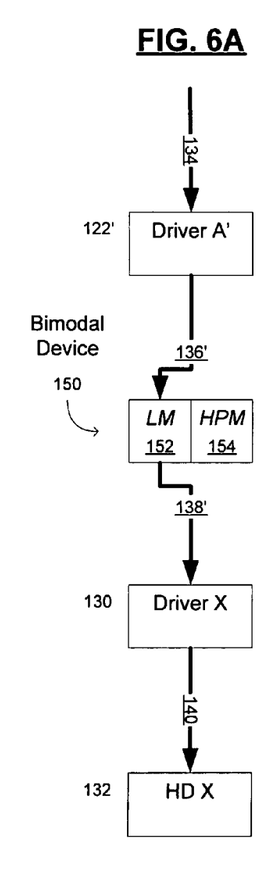
FIG. 6A illustrates the substitution of a bimodal device for the virtual device in the subsystem of FIG. 5, said bimodal device operating in a legacy mode.

FIG. 6A illustrates the substitution of a bimodal device for the virtual device in the subsystem of FIG. 5, said bimodal device operating in a legacy mode. In this figure, a legacy driver A' 122' interfaces 136' with the bimodal device 150 that comprises both a legacy mode 152 for hardware virtualization and a high-performance mode 154 for idealized virtualization. Since the legacy driver A' 122' is not designed to work with the idealized virtualization afforded by the high-performance mode 154 of the bimodal device 150, it instead works with the hardware virtualization afforded by the legacy mode 152 of the bimodal device 150 (as shown) which, in turn, interfaces 138' with the host OS driver X 130.

Figure 6B:
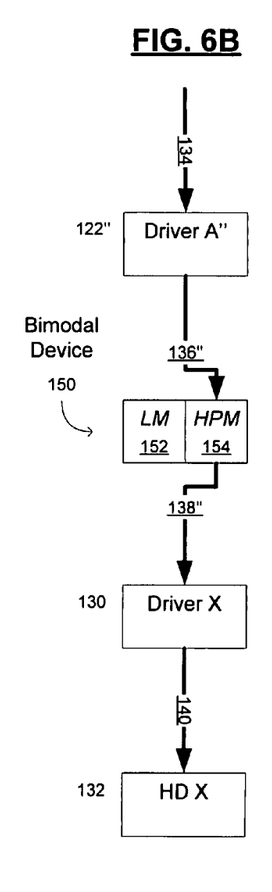
FIG. 6B illustrates the bimodal device of FIG. 6A operating in a high-performance mode.

In contrast, FIG. 6B illustrates the bimodal device operating in a high-performance mode. In this figure, a high-performance driver A" 122" interfaces 136" with the bimodal device 150. Since the high-performance driver A" 122" is capable of working with the idealized virtualization afforded by the high-performance mode 154 of the bimodal device 150, it does so (as shown) and the bimodal device 150, in turn, then interfaces 138" with the host OS driver X 130.

Hardware based "bimodal" approaches have been utilized in different technology areas to add new functionality to a hardware device that is otherwise incompatible with old functionality. For example, a traditional PS/2 mouse sends three bytes of information to the computer (X-coordinate, Y-coordinate, and button state), but when mouse manufacturers added a "scroll wheel" to mice they also needed to switch to a four-byte packet of information that included the scroll-wheel state. In order to provide backward compatibility with mouse drivers that had no knowledge of scroll wheels, the new mice started in "legacy mode" and only provided three bytes of information but, when a new-style driver was loaded, this driver enabled "scroll-wheel mode" by telling the mouse to start sending four-byte packets.

Bimodal Device Techniques

There are several techniques by which guest-mode drivers can identify a bimodal device (that is, differentiate between a real hardware device and an emulated device that supports additional modes of operation). These techniques include but are not limited to the following:

Unique device version number: Many devices contain software-accessible device version identifiers. These values are sometimes accessible directly through an I/O port or memory-mapped register. Other times, a specific command can be sent to the device asking it to return version information. In these cases, it is sometimes possible to modify the version number such that it doesn't correspond to any existing real hardware. Most drivers ignore the version number or test for a minimal version number, so choosing a new, unique version number should be possible without affecting compatibility with existing legacy drivers.

Unused registers: Some devices define a range of I/O ports or memory-mapped registers but only use a subset of the range. This is common because ranges are typically allocated in power-of-two blocks, plus engineers typically allocate more than necessary for future expansion. It's possible to use an "undefined" or "reserved" register in the range as an identifier. Real hardware will typically return a value of 0x00 or 0xFF when a reserved register is read. The emulated bimodal device could return a different, distinct value.

Handshaking: If the above two techniques are not feasible, it's usually possible to design some form of backdoor "handshaking". This involves a particular sequence of register accesses or device commands that are unlikely to be found in real-world usage scenarios. For example, if the device was a disk controller, a handshaking technique might involve sending a sequence of commands that read zero bytes starting a specific, predetermined list of sectors in a specific order (e.g. 0, 3 and 7). On a real controller, this would produce no effect (because a read of zero bytes is defined as a no-op). However, on a bimodal device, such a sequence could cause some other side-effect (e.g. a specific status bit to be set in the status register).

Naturally, the same techniques used to identify an emulated device capable of bimodal operation can also be used to automatically enable the "enhanced" mode for said device.

Conclusion

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for implementing a bimodal virtual device in a computer system, said method comprising:
   receiving, by the bimodal virtual device, a request, the bimodal virtual device configured to selectively operate with one or more virtual machines in two different modes, a first mode comprising a hardware mode during which the bimodal virtual device emulates a specific hardware device and is accessed by a virtual machine via a device driver that is configured to drive the specific hardware device by configuring emulated hardware components of the emulated specific hardware device, a processor requiring a first amount of cycles to emulate the hardware components of the emulated specific hardware device, and a second mode comprising an idealized mode, the idealized mode configured to send input/output instructions from a guest operating system to a host operating system, the processor requiring a second amount of cycles to send the input/output instructions, the second amount of cycles lower than the first;
   selecting an operating mode to service the request; and
   executing an instruction in accordance with the selected operating mode.

2. The method of claim 1 wherein:
   the bimodal virtual device is configured to operate in the hardware mode when a device driver interfacing with said bimodal virtual device has not been designed to interface with said bimodal virtual device operating in said second mode; and
   the bimodal virtual device is configured to operate in the idealized mode when the driver interfacing with said bimodal virtual device has been designed to interface with said bimodal virtual device operating in said second mode.

3. The method of claim 2 wherein the functionality of the second mode extends the functionality of the first mode.

4. The method of claim 1 wherein the functionality of the second mode comprises the functionality of the first mode.

5. The method of claim 1 wherein the functionality of the second mode comprises portions of the functionality of the first mode.

6. The method of claim 2 wherein the second mode is enabled through at least one bit in a virtual device register.

7. The method of claim 2 wherein the second mode is enabled through at least one bit in a register specifically created for utilization by one or more virtual machines.

8. The method of claim 2 wherein the second mode is enabled through a prescribed sequence of commands or data that change a value in at least one register.

9. The method of claim 2 wherein
the second mode is enabled through the use of a second mode driver instilled within a guest operating system environment; and
if the second mode driver is not present, a first mode driver is instead enabled.

10. A computer system, said computer system comprising:
a processor operatively coupled to memory, the memory including instructions for a bimodal virtual device;
the processor configured to effectuate a first mode of the bimodal virtual device, the first mode operable to emulate hardware components of an emulated hardware device, the processor requiring a first amount of processor cycles to effectuate the first mode; and
the processor configured to effectuate a second mode of the bimodal virtual device, the second mode optimized to send input/output instructions from a guest operating system to a host operating system, the processor requiring a second amount of processor cycles to effectuate the second mode, wherein the second amount of processor cycles is less than the first.

11. The system of claim 10 wherein:
the bimodal virtual device is configured to operate when a driver interfacing with said bimodal virtual device has not been designated to interface with an abstract device; and
the bimodal virtual device is configured to operate in the second mode when the driver interfacing with said bimodal virtual device has been designated to interface with said bimodal virtual device operating in said second mode.

12. The system of claim 11 wherein the functionality of the second mode extends the functionality of the first mode.

13. The system of claim 11 wherein the functionality of the second mode is independent of the functionality of the first mode.

14. The system of claim 13 wherein the functionality of the second mode disables the functionality of the first mode.

15. The system of claim 13 wherein the functionality of the second mode disables portions of the functionality of the first mode.

16. The system of claim 11 wherein the second mode is enabled through the use of at least one bit in a virtual device register.

17. The system of claim 11 wherein the second mode is enabled through the use of at least one bit in a register specifically created for utilization by one or more virtual devices.

18. The system of claim 11 wherein the second mode is enabled through the use of a prescribed sequence of commands or data that change a value in at least one register.

19. The system of claim 11 wherein
the second mode is enabled through the use of a second mode driver installed within a guest operating system environment.

20. A computer system, said computer system comprising:
a processor operatively coupled to memory;
the processor configured to effectuate a virtual machine environment;
the processor configured to effectuate a bimodal virtual device that is configured to operate in either a first or second mode;
the processor configured to operate in the first mode by executing instructions that effectuate emulated hardware components of the hardware virtual device, the processor requiring a first amount of processor cycles to effectuate the emulated hardware components; and
the processor configured to operate in the second mode by executing instructions that send input/output instructions from a guest operating system to a host operating system, the processor requiring a second amount of processor cycles to send the input/output instructions, the second amount of processor cycles lower than the first.

21. The system of claim 20 wherein:
the bimodal virtual device is configured to operate in the first mode when a driver interfacing with said bimodal virtual device has not been designated to interface with said bimodal device operating in said second mode; and
the bimodal virtual device is configured to operate in the second mode when the driver interfacing with said bimodal virtual device has been designated to interface with said bimodal virtual device operating in said second mode.

22. The system of claim 21 wherein the functionality of the second mode extends the functionality of the first mode.

23. The system of claim 21 wherein the functionality of the second mode is independent of the functionality of the first mode.

24. The system of claim 23 wherein the functionality of the second mode disables the functionality of the first mode.

25. The system of claim 23 wherein the functionality of the second mode disables portions of the functionality of the first mode.

26. The system of claim 21 wherein the second mode is enabled through the use of at least one bit in a virtual device register.

27. The system of claim 21 wherein the second mode is enabled through the use of at least one bit in a register specifically created for utilization by one or more virtual devices.

28. The system of claim 21 wherein the second mode is enabled through the use of a prescribed sequence of commands or data that changes a value in at least one register.

29. The system of claim 21 wherein
the second mode is enabled through the use of a second mode driver installed within a guest operating system environment; and
if the second mode driver is not present, a first mode driver is instead enabled.

30. A computer-readable storage medium comprising computer-readable instructions, said computer-readable instructions comprising:
instructions for a bimodal virtual device, the instructions for bimodal virtual device operable to configure a processor to operate in a first or a second mode,
the first mode emulating hardware components of a hardware device, the first mode requiring a first amount of processor cycles to emulate the hardware components; and
the second mode configured to send input/output instructions from a guest operating system to a host operating system, the second mode requiring a second amount of processor cycles to send the input/output instructions, the second amount of processor cycles being less than the first.

31. The computer-readable storage medium of claim 30 further comprising instructions for:
the bimodal virtual device to selectively operate in the first mode when a driver interfacing with said bimodal virtual device has not been designated to interface with said bimodal virtual device operating in said second mode; and the bimodal virtual device to selectively operate in the second mode when the driver interfacing with said bimodal virtual device has been designated to interface with said bimodal virtual device operating in said second mode.

32. The computer-readable storage medium of claim 31 further comprising instructions for the functionality of the second mode to extend the functionality of the first mode.

33. The computer-readable storage medium of claim 31 further comprising instructions for the functionality of the second mode that are separate and distinct from instructions for the functionality of the first mode.

34. The computer-readable storage medium of claim 33 further comprising instructions for the second mode to disable the functionality of the first mode.

35. The computer-readable storage medium of claim 33 further comprising instructions for the second mode to disable portions of the functionality of the first mode.

36. The computer-readable storage medium of claim 31 further comprising instructions for enabling the second mode through the use of at least one bit in a virtual device register.

37. The computer-readable storage medium of claim 31 further comprising instructions for enabling the second mode through the use of at least one bit in a register specifically created for utilization by one or more virtual devices.

38. The computer-readable storage medium of claim 31 further comprising instructions for enabling the second mode through the use of a prescribed sequence of commands or data that change a value in at least one register.

39. The computer-readable storage medium of claim 31 further comprising instructions for:

enabling the second mode through the use of a second mode driver installed within a guest operating system environment; and if the second mode driver is not present, enabling a first mode through the use of a first mode driver.

* * * * *